US006446328B1

(12) United States Patent
Heflin

(10) Patent No.: US 6,446,328 B1
(45) Date of Patent: Sep. 10, 2002

(54) BEARING CUP INSTALLATION TOOL

(75) Inventor: Fred Heflin, Evington, VA (US)

(73) Assignee: R&F Technologies, LLC, Lynchburg, VA (US)

( * ) Notice: Subject to any disclaimer, the term of this patent is extended or adjusted under 35 U.S.C. 154(b) by 0 days.

(21) Appl. No.: 09/413,085

(22) Filed: Oct. 6, 1999

(51) Int. Cl.[7] ........................... B21D 53/10; B23P 19/04
(52) U.S. Cl. .............................. 29/724; 29/258; 29/266
(58) Field of Search .............................. 29/898.07, 244, 29/270, 271, 278, 256, 258, 724, 266

(56) References Cited

U.S. PATENT DOCUMENTS

| | | | | | |
|---|---|---|---|---|---|
| 1,879,335 | A | * | 9/1932 | Kulp et al. | |
| 2,287,767 | A | * | 6/1942 | Dodge | |
| 2,648,563 | A | * | 8/1953 | Hall | 29/271 |
| 2,775,025 | A | | 12/1956 | Williams | |
| 2,826,806 | A | * | 3/1958 | McDonald | 29/271 |
| 3,685,126 | A | * | 8/1972 | Kane | 29/254 |
| 3,942,234 | A | | 3/1976 | Kepler | |
| 4,173,813 | A | | 11/1979 | Stockinger | |
| 4,339,865 | A | | 7/1982 | Shultz | |
| 4,429,447 | A | | 2/1984 | Davis | |
| 4,505,689 | A | | 3/1985 | Mazzioti | |
| 4,646,412 | A | | 3/1987 | Eade | |
| 4,701,989 | A | * | 10/1987 | Cayzer | 29/271 |
| 4,724,608 | A | * | 2/1988 | Parrott | |
| 4,794,683 | A | * | 1/1989 | Pacheco | 29/278 |
| 4,999,914 | A | * | 3/1991 | Cheng | 30/272.1 |
| 5,067,696 | A | * | 11/1991 | Morley | 269/49 |
| 5,165,169 | A | * | 11/1992 | Boyce | |
| 5,408,733 | A | * | 4/1995 | Blankenship | |
| 5,623,761 | A | * | 4/1997 | Chiang | 29/724 |
| 5,836,078 | A | | 11/1998 | Aiken et al. | |
| RE36,009 | E | * | 12/1998 | Shultz | |
| 6,158,110 | A | * | 12/2000 | Takacs | |

* cited by examiner

*Primary Examiner*—David P. Bryant
(74) *Attorney, Agent, or Firm*—Kimberly A. Chasteen, Esq.

(57) ABSTRACT

This invention is a specialized tool to install bearing cups on trucks and other large vehicles. Typically, conventional means to install bearing cups would be to use a device that includes striking the device with a hammer. Such an installation tool could damage the trucks wheel hub or the bearing cup. Other means exist utilizing complex, hard to use, mechanical devices. This invention is a simple, non-impact type bearing cup installation tool utilizing a rod, specialized cap tools, and a wrench. With just a few simple turns, the bearing cups are installed effortlessly and safely.

8 Claims, 6 Drawing Sheets

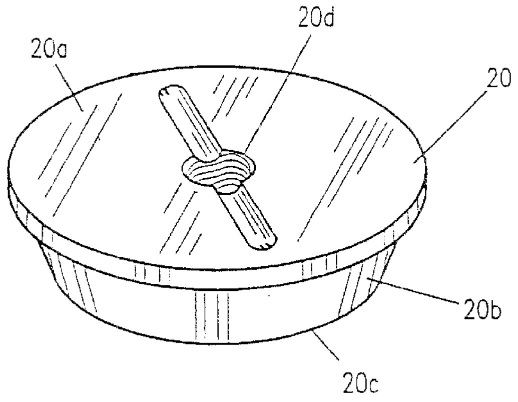
Figure 4a
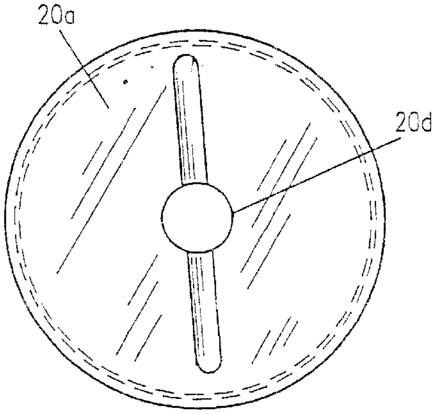
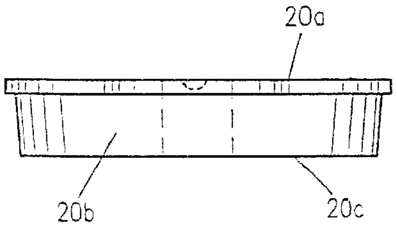
Figure 4c
Figure 4b

BEARING CUP INSTALLATION TOOL

RELATED APPLICATIONS

The present invention was first described in Disclosure Document Number 449192 filed on Dec. 28, 1998. There are no previously filed, nor currently any co-pending applications, anywhere in the world.

BACKGROUND OF THE INVENTION

1. Field of the Invention

The present invention relates generally to an apparatus and method for installing a bearing cup and, more particularly, to an apparatus and method for installing bearing cups for bearings in the wheel hub in trucks or other large vehicles.

2. Description of the Related Art

As anyone who performs a lot of mechanical work will attest, nothing beats having the proper tool for a job. The proper tool can save time, save money, produce a higher quality job, reduce damage to equipment, and provide for the increased safety of the worker. Each field of mechanical work has its own type of specialty tools, each performing a specialized task. One field where there has been a need for such a specialized tool is in the repair of wheel bearings for large trucks, particularly the inserting of bearing cups. Bearing cups used for bearings often have to be replaced on a regular basis with such units. In the past one method of seating such stops have included hitting them with a hammer. Needless to say, such a method can easily damage the cup or the hub in which it is mounted. Such damage can be extremely costly. Additionally, the action of hitting them with a hammer puts the worker at increased risk of physical injury, should the stop fly out of the hub.

In the related art, there exists many patents for various devices and methods for installing bearings, seals, gears, impellers, bushings and sprockets. Only two patents were found that even discuss bearing cups for wheel bearings and the like. U.S. Pat. No. 4,505,689 issued to Mazziotti discloses a mounting for a bearing cup of a universal joint. This reference has no relevance here since the present invention specifically has application to the wheels of trucks and large vehicles.

U.S. Pat. No. 4,429,447 issued to Davis discloses a bearing cup installation tool similar to the present invention. However, nowhere in the Davis reference does it discuss to what vehicles the device has application to. The device in Davis appears to be of a universal design to allow the installation of bearing cups of varying diameters in vehicles of all sorts. Further, the Davis design has a cross head with three pairs of radially extending arms for engaging an outer end of the bearing cup and a driving handle, whereby driving force imparted by a hammer, struck against an end of the driving handle, drives the bearing cup into the opening.

The present invention, in addition to having application specifically to trucks and large vehicles only, differs from Davis in many respects. First of all, the present invention uses a mechanical screw design to press the bearing cup into the bearing hub. This eliminates the need for a driving force from the use of a hammer or other instrument. Whenever a driving force delivered by impact is delivered, the potential for damaging the bearing cup or bearing hub is always present. The present invention eliminates this problem by allowing one to slowly and controllably press the bearing cup into the hub. The present invention also can accommodate bearing cups and hubs of varying diameters but it accomplishes this without requiring the use of a bulky and a mechanically complex expanding radial arm assembly.

Accordingly, there is a need for a less complicated device and method by which an individual can quickly and easily seat bearing cups for bearings in the wheel hubs of trucks without risk of damage or injury. The development of the Bearing Cup Inserting Tool fulfills this need.

A search of the prior art did not disclose any patents that read directly on the claims of the instant invention; however, the following references were considered related:

| U.S. Pat. No. | Inventor | Issue Date |
|---|---|---|
| 4,339,865 | Shultz | July 20, 1982 |
| 2,775,025 | Williams | December 25, 1956 |
| 5,836,078 | Aiken et al. | November 17, 1998 |
| 4,646,412 | Eade | March 3, 1987 |
| 4,505,689 | Mazzioti | March 19, 1985 |
| 4,429,447 | Davis | February 7, 1984 |
| 4,173,813 | Stockinger | November 13, 1979 |
| 3,942,234 | Kepler | March 9, 1976 |

SUMMARY OF THE INVENTION

It is therefore an object of the present invention to provide an improved bearing cup inserting tool and method.

It is another object the present invention to provide a bearing up inserting tool that seats bearing cups in hubs of trucks.

It is yet another object of the prevent invention to eliminate the use of a hammer to install bearing cups.

It is still yet another object of the prevent invention.to protect bearing surfaces and bearing cup surfaces while installing bearing cups.

It is yet still another object of the present invention to be quick, easy to use.

It is a feature of the present invention to allow for quick resets after use.

Briefly described according to one embodiment of the present invention, the Bearing Cup Inserting Tool, as its name implies, is a specialized tool to install bearing cups on trucks and other large vehicles. The tool accomplishes this task with a minimum of effort and without driving them with a hammer, which can damage them beyond repair. A threaded rod is inserted through the hub and the bearing cups. Next, specially designed bearing cup tools are added to each end, and a hex nut is placed on the free end of the rod. By wrenching the threaded rod, the bearing cup tools compress the bearing cups inward pressing the bearing cups into the recesses in the hub.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4*a* is a perspective view of an inner race of a Bearing Cup Inserting Tool; according to the preferred embodiment of the present invention;

FIG. 4*b* is a top view of an inner race of a Bearing Cup Inserting Tool; according to the preferred embodiment of the present invention;

FIG. 4*c* is a side view an inner race of a Bearing Cup Inserting Tool; according to the preferred embodiment of the present invention;

LIST OF REFERENCE NUMBERS

| | | | |
|---|---|---|---|
| 10 | Bearing Cup Inserting Tool | 30b | Aperture |
| 20 | Inner Race | 40 | Wheel Hub |
| 20a | Outer Surface | 50 | Outer Race |
| 20b | Tapered Surface | 50a | Outer Surface |
| 20c | Inner Surface | 50b | Tapered Surface |
| 20d | Aperture | 50c | Inner Surface |
| 21 | Needle Thrust Bearing | 50d | Aperture |
| 21a | Aperture | 50e | Groove |
| 21b | Needle Bearing | 51 | Pin |
| 22 | Washer | 52 | Outer Washer |
| 22a | Aperture | 53 | Grooved Nut |
| 30 | Rod | | |
| 30a | Nut | | |

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
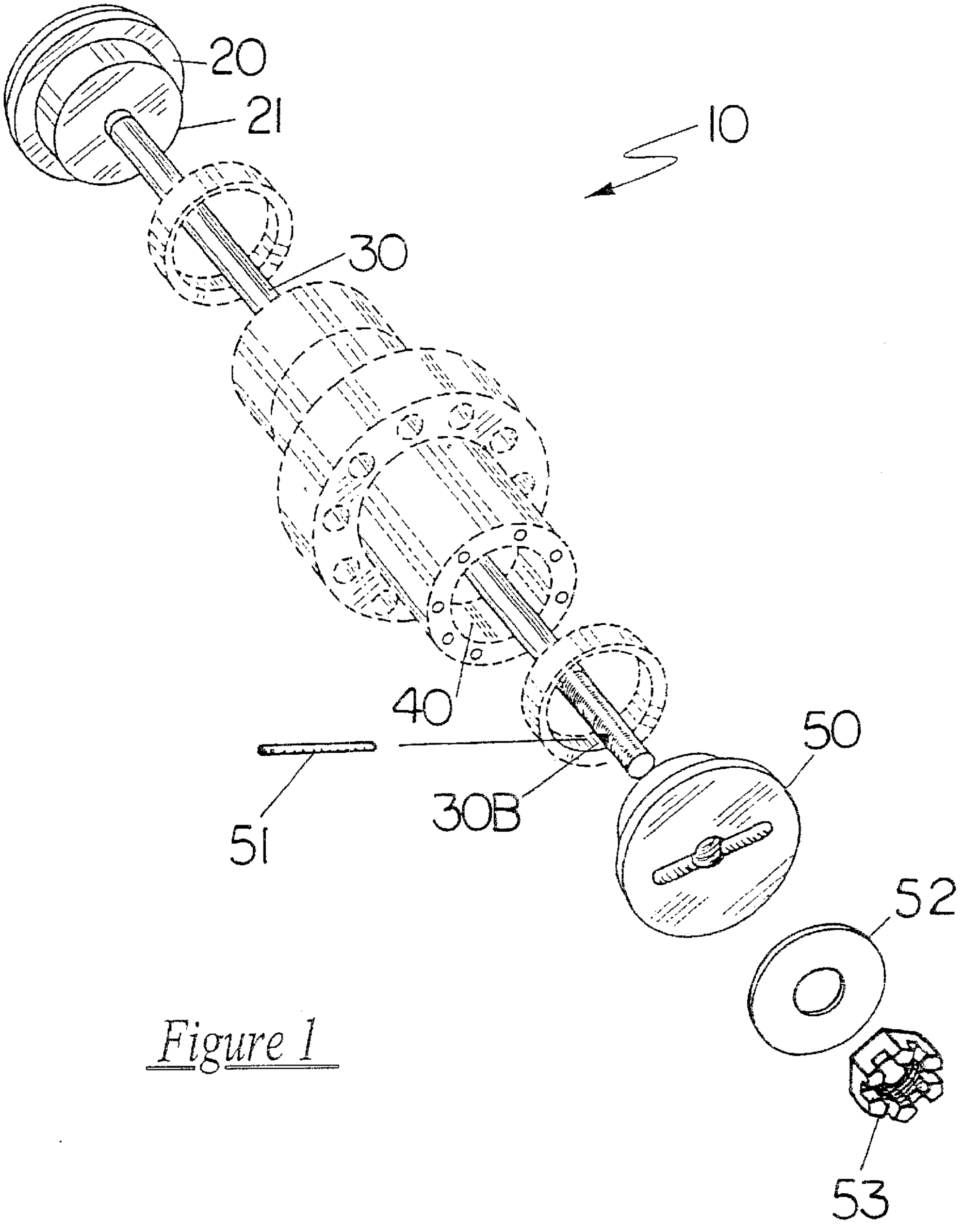
FIG. 1 is an exploded right perspective view of a Bearing Cup Inserting Tool and its contemplated usage in the wheel hub of a truck, according to the preferred embodiment of the present invention.

Referring now to FIG. 1, shown is an exploded view of Bearing Cup Inserting Tool 10 in its intended usage inserted through the center of a wheel hub of a truck (not part of the disclosure). Inner race 20 is composed of a flat, annular shaped disc with an aperture 20*d* in the center and is placed on the inner side of the wheel hub. Needle bearing 21 is placed adjacent to inner race 20 sandwiched between a pair of flat steel washers 22. Threaded rod 30, composed of an elongated steel rod threaded at both ends, is inserted through this assembly and an aperture 20*d* located in the center of inner race 20. A nut 30*a* is then screwed on to the end of threaded rod 30 to keep said needle bearing 21 and washer 21*a* on the end of threaded rod 30. (Shown in detail in FIG. 2) The other end of threaded end rod 30 is now inserted through the center aperture of an inner bearing cup desired to be installed on the inner side of the wheel hub so that the side of the inner bearing cup designed to receive a bearing is facing the inner surface 20*c* of said inner race 20. Bearing cups are typically designed so that the side of the bearing cup designed to receive a bearing is of a outwardly tapered shape. The tapered surface 20*b* of inner race 20 is sized to be just slightly larger than the inner diameter of said inner bearing cup and tapered inwardly so that it nearly mates with the tapered surface of said bearing cup. However, by design, the tapered surface of inner stop 20 is tapered 1° more outward than the tapered surface of said inner bearing cup so that said surfaces do not fully mate.

Threaded rod 30 continues through the annular opening through the wheel hub of a truck and emerges on the opposite side with enough length protruding to install the rest of the tool onto. An outer bearing cup is now slid onto the protruding portion of rod 30 so that its tapered side faces outward for receiving a bearing. Outer race 50 is now slid over the end of rod 30 and race pin 51 is inserted in aperture 30*b* specially formed in rod 30 and received in groove 50*e* in its outer surface 50*a* such that rod 30 is prevented from turning. The inwardly facing side of outer race 50 has an inwardly tapered surface 50*b* so that it can engage the outwardly tapered surface of an outer bearing cup. However, by design, tapered surface 50*b* of outer stop 50 is angled 1° more than the tapered surface of the outer bearing cup. This to prevent the two surfaces from completely mating. Grooved nut 53 is then threaded onto the free end of rod 30. Grooved nut 53 may be also supplemented with a locking washer or other means to prevent grooved nut 53 from turning relative to rod 30.

As the size of the bearing cups vary from wheel manufacturer to another, it is envisioned that the sizes of inner race 20 and outer race 50 would have to vary to match. Included with every Bearing Cup Inserting Tool will be an assortment of inner race 20 and outer race 50 to match the various manufacturers requirements. It is envisioned that the races supplied will encompass over ninety percent of the truck wheel hub manufacturers requirements.

Figure 2:
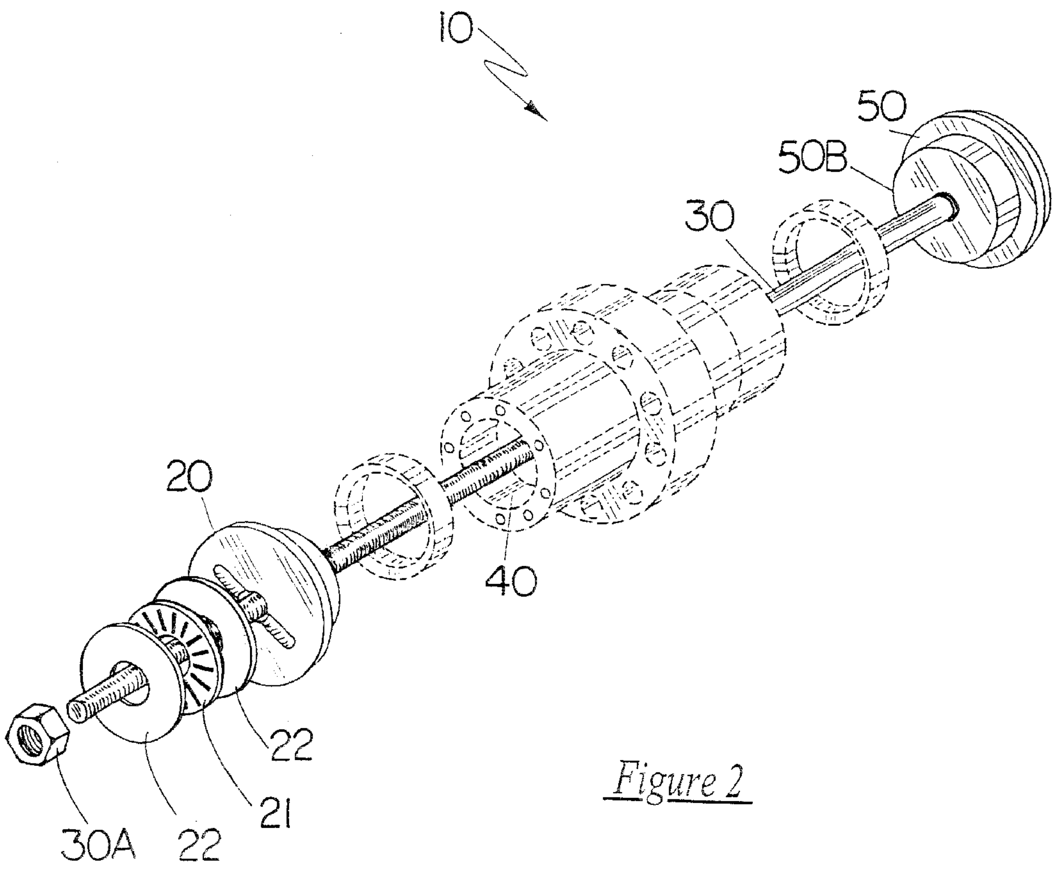
FIG. 2 is an exploded left perspective view of a Bearing Cup Inserting Tool and its contemplated usage in the wheel hub of a truck, according to the preferred embodiment of the present invention.

Referring to FIG. 2, shown is an exploded left side perspective view of Bearing Cup Inserting Tool 10 in its intended usage inserted through the center of a wheel hub of a truck (not part of the disclosure). Seen is the end of threaded rod 30 with nut 30*a* on it. Once all of the components of the Bearing Cup Inserting Tool 10 and the bearing cups are in place, nut 30*a* is wrenched so that threaded rod 30 causes inner race 20 and outer race 50 to be controllably urged toward each other. Outer race 50 and inner race 20 will urge the adjacent bearing cup into the recesses in the wheel hub. As is typical, a wheel hub will have annular ridges recessed within the circular aperture in the center on its inner wall to provide a surface for the bearing cups to butt up against and prevent the bearing cups from moving further into the center of the wheel hub. Nut 30*a* is wrenched until both bearing cups are seated firmly against the ridges in the center of the wheel hub.

Figure 3A:
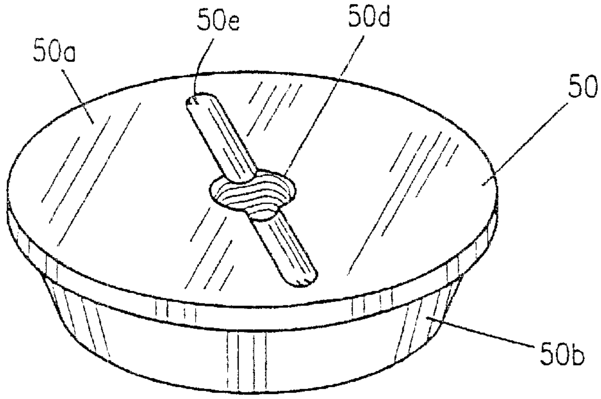
FIG. 3*a* is a perspective view of an outer race of a Bearing Cup Inserting Tool, according to the preferred embodiment of the present invention.
Figure 3B:
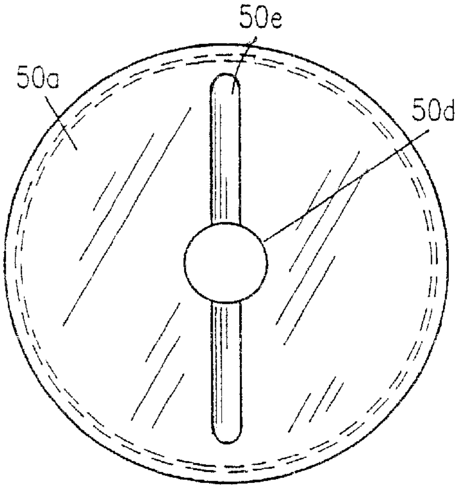
FIG. 3*b* is a top view of an outer race of a Bearing Cup Inserting Tool, according to the preferred embodiment of the present invention.
Figure 3C:
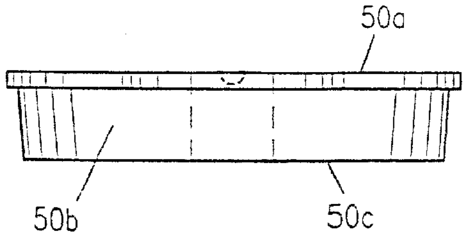
FIG. 3*c* is a side view of an outer race of a Bearing Cup Inserting Tool; according to the preferred embodiment of the present invention.
Figure 5A:
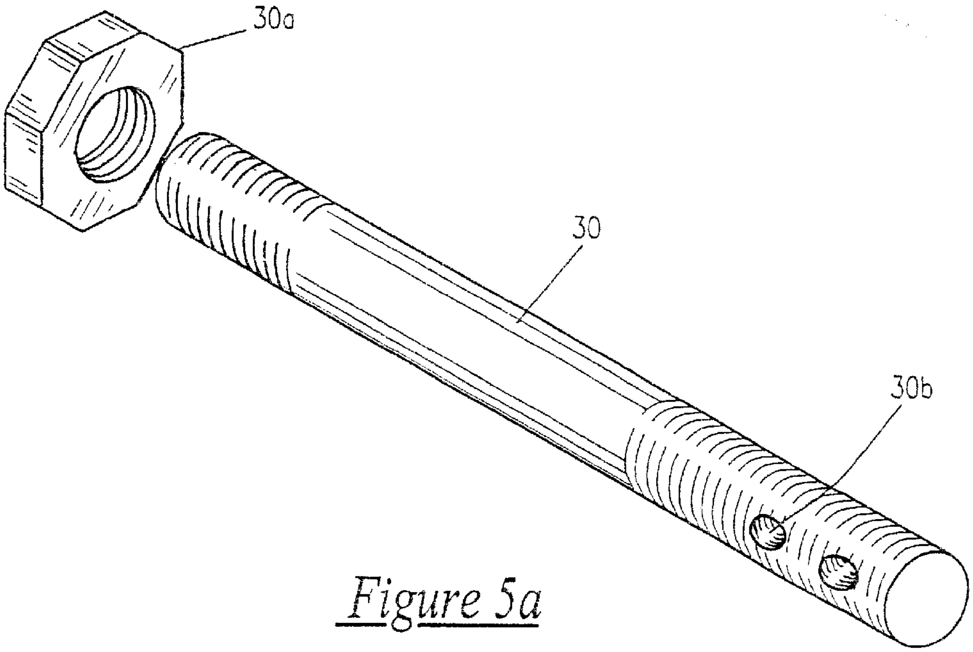
FIG. 5*a* is a perspective view of a threaded rod of a Bearing Cup Inserting Tool, according to the preferred embodiment of the present invention.
Figure 5B:
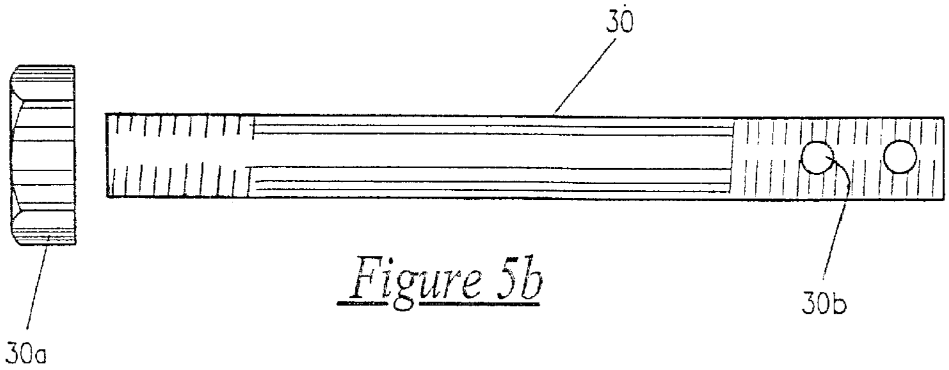
FIG. 5*b* is a side view of a threaded rod of a Bearing Cup Inserting Tool, according to the preferred embodiment of the present invention.
Figure 5C:
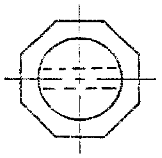
FIG. 5*c* is a rear view of threaded rod of a Bearing Cup Inserting Tool, according to the preferred embodiment of the present invention.

Referring to FIGS. 3*a,* 3*b* and 3*c,* shown is a perspective, top, and side view of outer race 50. Outer race 50 is generally annular in shape and has an aperture 50*d* formed in the center, an outer surface 50*a,* a tapered surface 50*b* on the sides, and an inner surface 50*c*. Outer surface 50*a* has a groove 50*e* cut in it for receiving pin 51 to prevent rotation of threaded rod 30 relative to said outer race 50. The sides 50*b* of outer race 50 are tapered inwardly to engage the outwardly tapered surface of said bearing cups except that the tapered surface 50*b* of outer race 50 is angled 1° more than the tapered surface of said bearing cups. This is to prevent the two surfaces from completely mating and possibly becoming locked together when the bearing cups are urged into the cavity of the wheel hub.

Referring now to FIGS. 4*a,* 4*b,* and 4*c,* a perspective, top and side view of an inner race 20 is shown. Inner race 20 is generally annular in shape having an outer surface 20*a,* an aperture 20 formed in the center, a tapered surface 20*b* on the sides, and an inner surface 20*c.*

Referring now to FIGS., 5*a,* 5*b,* and 5*c,* a perspective, side, and cross sectional view of rod 30 is shown. Rod 30 is an otherwise conventional steel rod threaded on both ends and an aperture 30*b* drilled through one end for receiving pin 51. The length of rod 30 would depend on the width of the wheel hub which varies from manufacturer to manufacturer. Although there is no specific diameter of rod required, it must be of large enough diameter to withstand the forces exerted on it while urging bearing cups into the cavity of the wheel hub. It must not be of such a large diameter that it will not fit through the hollow center of the bearing cups, the apertures of inner race 20 and outer race 50.

Figure 6A:
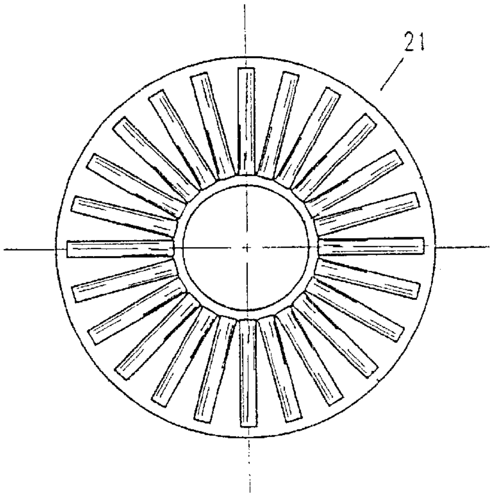
FIG. 6*a* is top view of a needle thrust bearing of a Bearing Cup Inserting Tool, according to the preferred embodiment of the present invention.
Figure 6B:
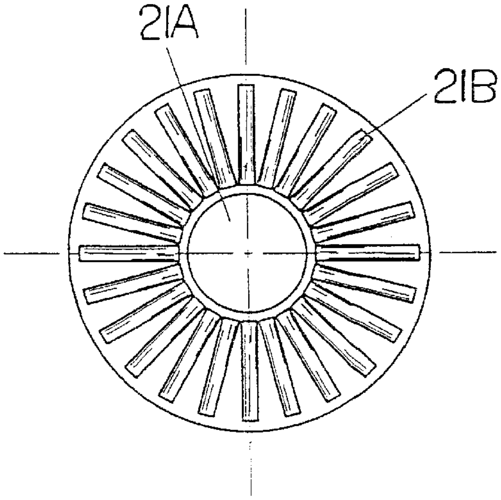
FIG. 6*b* is a bottom view of a needle thrust bearing of a Bearing Cup Inserting Tool, according to the preferred embodiment of the present invention.
Figure 6C:
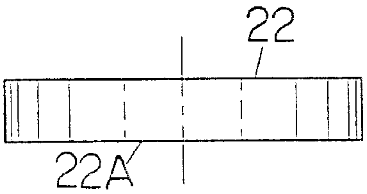
FIG. 6*c* is a side view of a needle thrust bearing of a Bearing Cup Inserting Tool, according to the preferred embodiment of the present invention.

Referring now to FIGS. 6*a,* 6*b,* and 6*c,* a top, bottom, and side view of needle bearing 21 is shown. Needle bearing 21 is generally annular in shape, having a plurality of inwardly tapered steel rollers 21*b* radially spaced around an annular disc and an aperture 21*a* in the center. Needle roller bearing 21 is placed on the inner side of inner stop 20 during bearing cup installation to prevent the bearing cup installation tool from binding with the bearing cups and causing the bearing cups to rotate as rod 30 is wrenched.

Figure 7A:
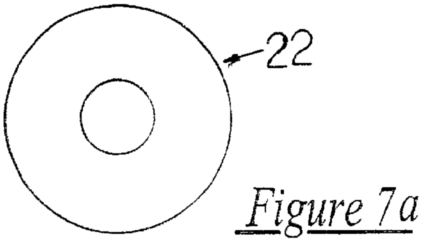
FIG. 7*a* is a top view of an inner and outer washer of a Bearing Cup Inserting Tool, according to the preferred embodiment of the present invention.
Figure 7B:
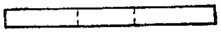
FIG. 7*b* is side view of an inner and outer washer from a needle thrust bearing of a Bearing Cup Inserting Tool, according to the preferred embodiment of the present invention.

Referring now to FIGS. 7*a* and 7*b,* a washer 22 is shown that is used as described for use with needle bearing 21 as described above. Washer 22 is generally made from steel, circular in shape, and has an aperture 22 in the center. Washer 52 is identical to washer 22 so no further illustration is necessary.

Figure 8:
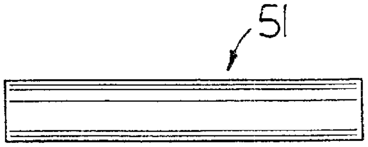
FIG. 8 is a side view of a race pin of a Bearing Cup Inserting Tool, according to the preferred embodiment of the present invention.

Referring now to FIG. 8, a pin 51 is shown for insertion into aperture 30*b* of rod 30 to prevent rod 30 from rotating relative to outer race 50. Pin 51 is an otherwise conventional steel pin chosen to fit within aperture 30*b* and groove 50*e.*

2. Operation of the Preferred Embodiment

To use the present invention, one selects the appropriate sized inner and outer races and threaded rod. The rod is inserted through the inner race first, followed by a pair of washer with a needle bearing in between, an inner bearing cup, the wheel hub, the outer bearing cup, and then finally the outer race. A pin is then inserted through an aperture in the rod and slipped into a groove on the outer surface of the outer race. Hex nuts are threaded onto both ends of the rod. A pin is inserted through a aperture specially formed in the nut and the rod to prevent the nut from turning relative to the rod. Then, a wrench of suitable size is applied to the other nut and the nut is wrenched causing a contraction of the entire assembly towards the center of the wheel assembly. As the contraction continues, the inner and outer bearing cups are urged into the cavity of the wheel hub in an interference type fit. This urging continues until both the inner and outer bearing cups are seated against the ridges on the inner wall of the wheel hub. Once the inner and outer bearing cups are installed and seated, the nut is wrenched in the opposite direction and the entire tool is removed from the hub.

The foregoing description is included to illustrate the operation of the preferred embodiment and is not meant to limit the scope of the invention. The scope of the invention is to be limited only by the following claims.

What is claimed is:

1. A tool for installing bearing cups in the wheel hub of a truck, comprised of:

an inner race, said inner race being generally annular in shape having an outer surface, an aperture formed in the center, a tapered surface on the sides, and an inner surface;

a pair of washers, said pair of washers located adjacent to said inner race;

a needle bearing, said needle bearing sandwiched between said pair of washers;

a threaded rod, said threaded rod being threaded on both ends;

a nut, said nut threaded onto one end of said threaded rod;

a grooved nut, said grooved nut threaded onto the other end of said threaded rod.

2. The tool of claim 1, wherein said nut is threaded onto said threaded rod to keep said needle bearing and said pair of washers on said threaded rod, and the other end is inserted through a center aperture of an inner bearing cup and an annular opening in a said wheel hub and continues through said opening and emerges on the opposite side of said hub with enough length protruding to install an outer bearing cup, said outer race, and said grooved nut.

3. The tool of claim 2, wherein a tapered surface of said inner race is sized to be just slightly larger than an inner diameter of an inner bearing cup and tapered inwardly so that it nearly mates with a tapered surface of said bearing cup, and further wherein said tapered surface of said inner race is tapered 1° more outward than said tapered surface of said inner bearing cup so that said surfaces do not fully mate.

4. The tool of claim 3, wherein a tapered surface of said outer race is sized to be just slightly larger than an inner diameter of an outer bearing cup and tapered inwardly so that it nearly mates with a tapered surface of said bearing cup, and further wherein said tapered surface of said outer race is tapered 1° more outward than said tapered surface of said outer bearing cup so that said surfaces do not fully mate.

5. The tool of claim 1, wherein an aperture is provided in one end of said threaded rod for receiving a pin.

6. The tool of claim 5, wherein a groove is formed in said outer surface of said outer race for receiving said pin to prevent rotation of said threaded rod relative to said outer race.

7. The tool of claim 6, wherein once all of the components of said tool and said inner and outer bearing cups are in place, and said nut is wrenched on said threaded rod, said inner race and said outer race are controllably urged toward each other and said outer race and said inner race urge the bearing cups into the recesses in said wheel hub.

8. The tool of claim 7, wherein several sizes of said inner race and said outer race are included in a kit for use with various sizes of said wheel hubs according to different wheel hub manufacturers.

* * * * *